Feb. 3, 1970
A. C. LIBHART
3,493,085
POSITIVE LOCKING CASTER BRAKE
Filed March 18, 1968
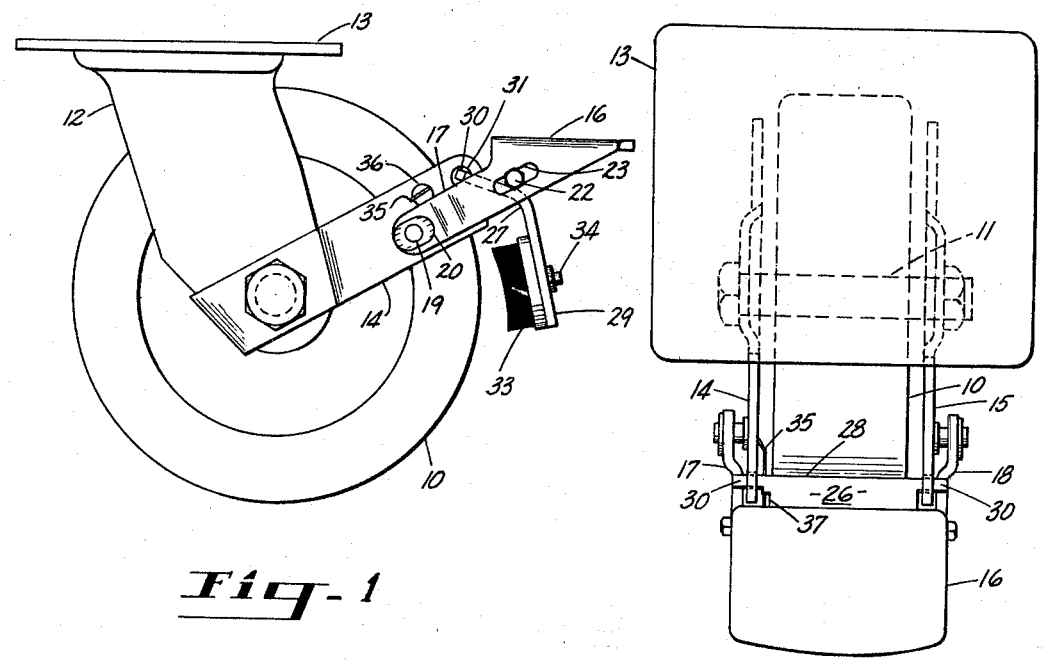
Fig-1
Fig-3
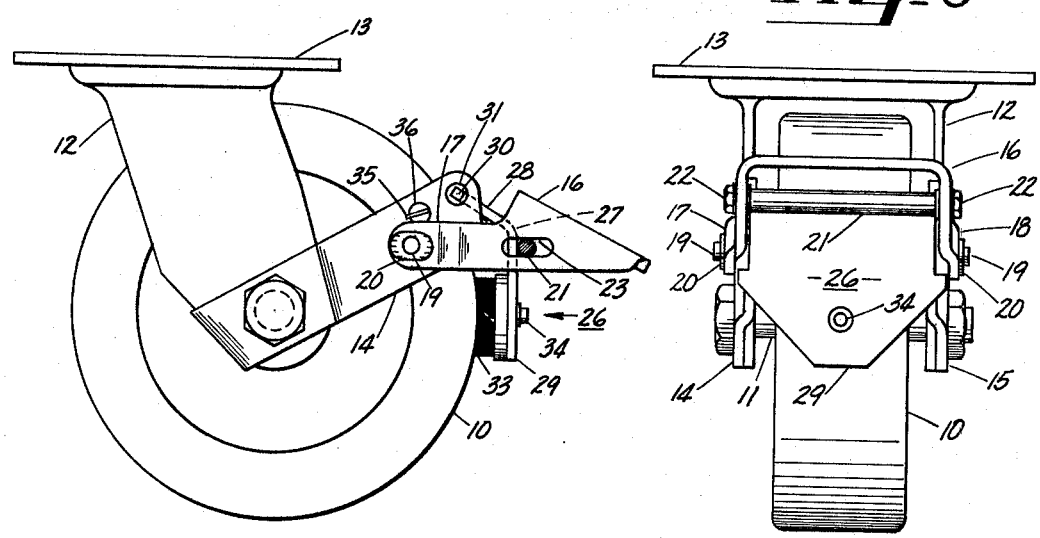
Fig-2
Fig-4
INVENTOR.
ANTHONY C. LIBHART
BY Bosworth Sessions
Herrstrom & Cain
ATTORNEYS 3,493,085
POSITIVE LOCKING CASTER BRAKE
Anthony C. Libhart, Craighead, Ark., assignor to The Colson Corporation, Chicago, Ill., a corporation of Illinois
Filed Mar. 18, 1968, Ser. No. 713,947
Int. Cl. F16d 63/00
U.S. Cl. 188—74                1 Claim

ABSTRACT OF THE DISCLOSURE

A positive-locking caster wheel brake operable by a foot lever which when depressed serves to force a pivoted brake shoe into engagement with the caster wheel. The foot lever has arms on opposite sides of the caster wheel pivotally connected to fixed supports and carries a cam follower pin extending between the arms outwardly of the caster wheel and parallel to its axis. The cam follower pin operates a brake shoe carrier having an angular bend with the included angle facing the caster wheel and an upper leg pivotally connected to the supports. When the lever is depressed the cam follower pin is pushed over the bend to an overcenter position while forcing the carrier to pivot inward to apply braking pressure to the caster wheel.

Background of the invention

This invention relates to foot operated brakes for caster wheels and more particularly to a positive locking brake which will prevent the wheel from rolling when the vehicle carried on the casters is located on a slope or in some other position where rolling movement must be prevented. Positive locking caster brakes have conventionally used an eccentric cam roller to apply and lock the brake shoe against the caster wheel such as is disclosed in U.S. Patent No. 2,262,433 to Eucker et al., U.S. Patent No. 2,484,094 to Jackson and U.S. Patent No. 2,709,828 to Noelting et al. A particular disadvantage of this type of brake construction is that it is not normally adjustable to compensate for wear of the caster wheel tread or wear of the brake shoe. The brake construction of the present invention however provides a novel construction whereby the brakes may be readily adjusted when necessary so as to overcome the disadvantage indicated above and also to provide other features and advantages not obtainable from the prior art.

Summary of the invention

It is among the objects of the invention to provide a positive locking caster brake which may be readily fabricated from a minimum number of parts and which is of relatively low-cost construction.

Another object is to provide a means for adjusting a positive locking caster brake to compensate for wear of the caster wheel tread and the brake shoe and provide consistent braking force throughout the life of the caster wheel.

These and other objects are achieved by means of a brake construction including a pair of fixed parallel brake supports extending beyond the circumference of the caster wheel on opposite sides thereof and which support an operating lever having a pair of spaced parallel arms connected on opposite sides of the caster wheel to the respective supports for pivotal movement about an axis parallel to the caster wheel axis. Also connected to the supports is an angularly bent brake shoe carrier having an upper leg pivotally connected between the outer ends of the supports for pivotal movement about an axis parallel to the caster wheel axis, and a lower leg carrying a brake shoe engageable with the caster wheel tread. The bend has its included angle facing the caster wheel and the lower leg lies in a plane having a normal line perpendicular to and intersecting the pivot axis of the operating lever, all within the included angle of the bend. The carrier is biased away from engagement with the caster wheel tread to prevent brake application while the wheel is rolling. The operating lever carries a cam follower pin between its arms, outwardly of the brake shoe carrier and extending parallel to the caster wheel axis. The pin is engageable with the brake shoe carrier on both of its legs adjacent to the bend. When the lever is depressed, the pin forces the brake shoe into locking engagement with the caster wheel tread when pushed past the bend into engagement with the lower leg of the brake shoe carrier. According to the preferred embodiment, slots are provided in the arms of the lever extending along a radius from the lever axis and the ends of the cam follower pin are connected by adjusting nuts extending through the slots so that its position may be adjusted to increase or decrease the braking pressure applied.

The means biasing the carrier to a brake released position is also effective through engagement between the upper leg of the carrier and the cam follower pin, to lift the lever upward.

Other objects, uses and advantages of the invention will become apparent from the following detailed description and drawings.

Brief description of the drawings

FIGURE 1 is an elevational view of a caster wheel and a self-locking brake embodying the invention with the brake shown in its released condition;

FIGURE 2 is an elevational view similar to FIGURE 1 with parts broken away and shown in section and with the brake applied and locked;

FIGURE 3 is a plan view of the caster wheel and brake of FIGURES 1 and 2; and

FIGURE 4 is an end elevational view of the caster wheel and brake of FIGURES 1 and 2.

Description of the preferred embodiment

Referring more particularly to the drawings there is shown a caster wheel 10 carried by a journal pin 11 in a wheel fork 12. The wheel fork 12 is pivotally mounted in a swivel plate 13 in the embodiment shown, however the invention has application to fixed wheels as well.

Secured to each arm of the wheel fork 12 is a support plate 14 and 15, the plates 14 and 15 extending parallel to one another beyond the circumference of the caster wheel 10. An operating lever 16 having two spaced parallel arms 17 and 18 is pivotally connected to the plates 14 and 15 intermediate their ends by stud rivets 19 which define an axis parallel to the wheel axis. The arms 17 and 18 are located outside their respective adjacent support plates 14 and 15 with the stud rivets 19 mounted in the plates 14 and 15 and extending outwardly through the arms. The arms 17 and 18 are secured to the studs of the stud rivets 19 by means of snap nuts 20. Supported between the arms 17 and 18 of the operating lever 16 outwardly of the lever axis is a cam follower pin 21 also located parallel to the wheel axis. The pin 21 is preferably formed of case hardened steel and secured to the arms 17 and 18 by means of adjusting screws 22 which are threaded into the ends of the pin 21 and which extend through slots 23 formed in the arms 17 and 18. The slots 23 extend generally along a radial line from the axis of the operating lever 16 and accordingly the position of the pin 21 may be adjusted as desired merely by loosening and then retightening the adjusting screws 22.

Pivotally connected between the outer ends of the plates 13 and 14 is a brake shoe carrier 26 having an angular bend 27 intermediate its ends which divides the carrier into an upper leg 28 and a lower leg 29. The upper leg 28 has outwardly extending lugs 30 received in circular openings 31 in the plates 13 and 14 to provide a pivotal connection. The lower leg 29 of the carrier 26 is located on the opposite side of the bend 27 and carries a brake shoe 33 preferably formed of rubber or other resilient material and secured to the lower leg 29 by a rivet 34.

The brake shoe 33 is adapted to swing into and out of engagement with the tread of the caster wheel 10 as the brake shoe carrier 26 swings around its axis between a brake released position shown in FIGURE 1 and a brake engaged position shown in FIGURE 2. The brake shoe carrier 26 is biased to its brake released position by means of a single turn wire coil spring 35 having one end secured in an opening 36 in the support plate 14, its loop located in a notch 37 formed at one side of the upper leg 28 and its other end engaging the inner surface of the upper leg 28 to apply a biasing force. The same force is effective to push up the cam follower pin 21 and thus lift the operating lever 16 to a raised position shown in FIGURE 1.

It will be apparent that this brake assembly can either be affixed to the caster wheel fork 12 during manufacture of the product or else it can be sold as a separate unit and mounted on standard brakeless caster wheel forks at any time. The mounting of the brake assembly is accomplished merely by removing the journal pin, locating the support plates 14 and 15 on the arms of the fork and reinserting the journal pin.

Operation

To operate the brakes the operator need merely depress the foot pedal on the operating level 16 to cause the lever to pivot about its axis and force the cam follower pin 21 downwardly along the upper leg 28 of the brake shoe carrier 26. This action causes the brake shoe carrier 26 to swing inwardly and press the brake shoe 33 against the tread of the caster wheel 10. As the cam follower pin 21 moves around the bend 27 to the lower leg 29 of the brake shoe carrier 26 it reaches an overcenter position wherein the force resisting brake application does not have a component tending to raise the cam follower pin 21 back around the bend. Accordingly in this condition the brakes are locked and will not be released until the operating lever 16 is lifted. This may be done for example using the toe of the operator's shoe.

When the operating lever 16 is lifted the cam follower pin moves upwardly around the bend 27 to the upper leg 28 of the brake shoe carrier 26 and thus is moved out of its overcenter position so that the spring 35 will be effective to swing the brake shoe carrier 26 out of its brake applying position as well as to lift the operating lever 16 to its brake released condition shown in FIGURE 1.

While the invention has been shown and described with reference to a specific embodiment thereof this is intended only for the purpose of illustration rather than limitation and other variations and modifications will become apparent to those skilled in the art within the intended spirit and scope of the invention as herein specifically illustrated and described. Therefore the patent is not to be limited in scope and effect to the preferred form illustrated and described herein nor in any other way that is inconsistent with the progress by which the art has been advanced by the invention.

I claim:
1. A brake for a caster wheel comprising a pair of fixed parallel brake supports on opposite sides of the caster wheel, an operating lever having a pair of spaced parallel arms connected on opposite sides of said caster wheel to the respective supports for pivotal movement about a first axis spaced from and parallel to the caster wheel axis, a brake shoe carrier having an angular bend defining an upper leg connected at its outer end between said supports for pivotal movement about a second axis spaced from and parallel to the caster wheel axis, and a lower leg carrying a brake shoe engageable with the caster wheel tread, said bend having its included angle facing the caster wheel and said lower leg having a normal line perpendicular to and intersecting said first axis within said included angle, spring means biasing said brake shoe carrier away from engagement with said caster wheel tread, and a cam follower pin carried by said operating lever between said arms and extending parallel to said caster wheel axis, said arms having longitudinal slots that receive the ends of said pin whereby said pin is connected to said arms for adjustment toward and away from the axis of said lever, said pin being engageable with said brake shoe carrier on both legs thereof adjacent said bend and being adapted to lock said brake shoe carrier in braking position when pushed past said bend to said lower leg by said operating lever.

References Cited

UNITED STATES PATENTS

| 1,941,122 | 12/1933 | Williams et al. | |
| 1,998,236 | 4/1935 | Herold. | |
| 2,583,568 | 1/1952 | Heizer | 74—96 X |
| 2,782,666 | 2/1957 | Reid | 74—96 X |
| 2,827,985 | 3/1958 | Butler. | |
| 2,915,775 | 12/1959 | Skupas | 16—35 |

GEORGE E. A. HALVOSA, Primary Examiner

U.S. Cl. X.R.

16—35; 74—96, 107; 188—1, 196